July 6, 1954     J. O. ALMEN     2,682,936
PRESTRESSED BRAKE DISK
Filed July 15, 1948

Inventor
John O. Almen
By
Spencer Willets, Helmig Caillo
Attorneys

Patented July 6, 1954

2,682,936

UNITED STATES PATENT OFFICE 2,682,936

PRESTRESSED BRAKE DISK

John O. Almen, Royal Oak, Mich., assignor to General Motors Corporation, Detroit, Mich., a corporation of Delaware Application July 15, 1948, Serial No. 38,869

8 Claims. (Cl. 188—218)

This invention relates to brake drums and more particularly to a pre-stressed brake drum.

The object of the invention is to produce a brake drum that is pre-stressed to prevent the propagation of stress-induced cracks.

A further object of the invention is to produce a brake drum in which the core metal is under compression and the surrounding metal under tension.

At the present time brake drums are hardened at the working surface by placing the surface metal under compression by hammering or quenching. Due to the severe temperature and stress variations this prestressing at the braking surface is destroyed or penetrated by local cracks. Since the core of the brake drum has not been treated there is no resistance to the propagation of these cracks which produce mechanical failure. In accordance with this invention the internal portion or core of the brake drum should be placed in compression and the surface in tension. In a brake drum of this construction the cracks, which are bound to start at the braking surface, will be stopped or retarded as they enter the compressively stressed core.

Though these principles are applicable to brake drums in general in the preferred embodiment I have illustrated the invention as applied to a railway disc brake.

Figure 1:
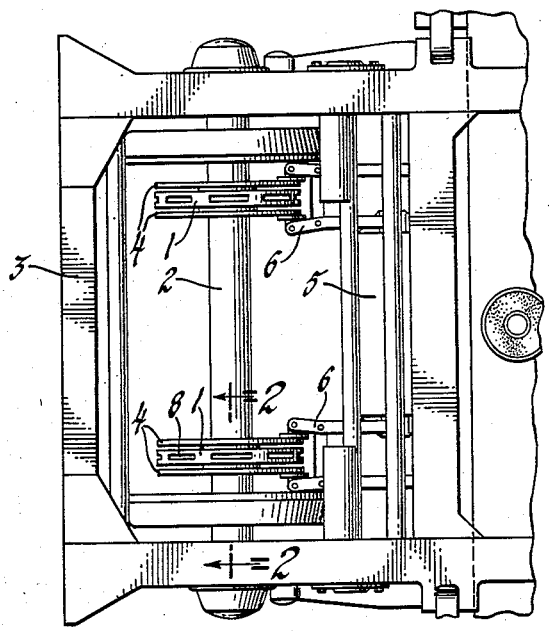
Figure 1 is a partial plan view of a railway truck.
Figure 2:
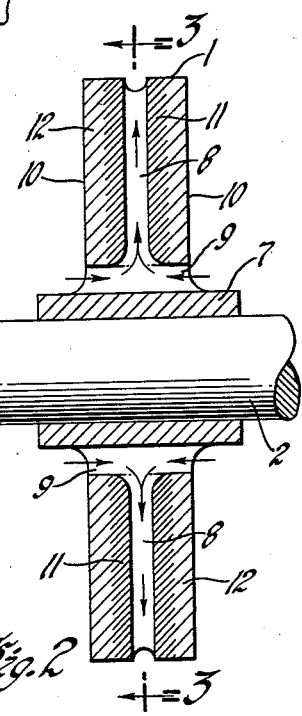
Figure 2 is an enlarged cross section of Figure 1 on the line 2—2 showing the brake disc.
Figure 3:
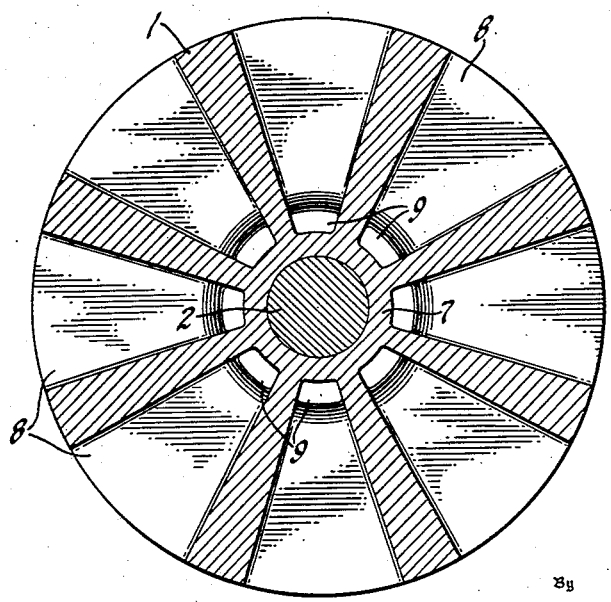
Figure 3 is a cross section of Figure 2 on the line 3—3.

Illustrated in Figure 1 is a railway truck which may be of any conventional type such as shown by Allan R. Cripe in his Patent No. 2,594,734. The brake drum or disc 1 is mounted on the axle 2 which is mounted by suitable bearings on the railway truck 3. The braking force is applied to the side surfaces of the brake disc by the brake shoes 4. The shoes 4 are annular plates operated by the power cylinder 5 through the linkage 6.

The brake disc 1 may have a suitable enlargement or hub 7 for securing it by any suitable means to the shaft 2. In order to cool the disc suitable air flow passages 8 are provided through the core or center of the disc. Each passage consists of an entrance portion 9 extending from each side of the disc adjacent the hub to the center of the disc and connecting with the radial passage 8. Thus cooling air is drawn into the passage through the portion 9 adjacent the hub and expelled through passage 8 at the periphery of the disc.

In order to prevent the growth of stress cracks due to the severe temperature and stress variations at the braking surface 10, the metal should be treated so that the core or central portion 11 illustrated by the double shade lines is in compression while the surrounding or outer portion 12 illustrated by the single shade lines is in tension. When the metal of the brake disc 1 is prestressed to produce this distribution of stresses, cracks that start in the surface 10 will be retarded or stopped by the central compressively stressed portion 11 before failure occurs.

This improved initial pre-stressing with the stresses arranged as explained above may be accomplished by several methods. Each of these methods will pre-stress the metal to place the core of the brake disc 1 under a compressive stress by inducing a tensile stress in the surface or braking layer.

The pre-stressing may be obtained by a heat treating and quenching process which consists of pre-heating the disc to an elevated temperature within the plastic range for the metal used. The disc is then rapidly cooled or quenched internally by passing air or liquid brine through the internal passages 8—9. When the inner metal or core 11 is thus cooled it shrinks, but since the outer portion or surface layer 12 is still in the plastic temperature range it will deform. This deformation in layer 12 must be great enough to exceed the yield strength of the metal at the elevated temperature. Then as the outer layer 12 continues to cool it will contract and compress the inner layer 11 to develop a residual compressive stress in the inner layer 11. The magnitude of the residual compressive stress will increase with increased pre-heat temperature and with increased slope of the temperature gradient or an increased rate of cooling, due to the fact that the yield strength decreases with increasing temperature, and the magnitude of the contraction of layer 11 upon cooling is increased with increased temperature. Also a higher temperature or cooling rate will be required with the use of steels with lower coefficients of expansion and with parts of larger volume in order to produce the same residual stress. Thus as the layer 12 gradually cools, it contracts and induces tension in the surface layer and compresses the inner layer 11. The pre-heating temperature that should be employed to obtain a desired magnitude of residual compressive stress will therefore depend on the size of the brake disc, the yield strength of the material at elevated temperatures and the rate at which layer 11 can be cooled.

This distribution of the stresses may also be produced by induction or flame heating of the outer layer 12 of the cold casting. The outer surface is heated to the temperature at which the metal deforms sufficiently to exceed the yield strength at the elevated temperature. Then when the metal is cooled, the outer portion will contract and compress the core portion to induce a residual compressive stress. The surface layers will have a complementary residual tensile stress.

In addition to the thermal methods of producing pre-stressed brake discs, mechanical cold working of the metal on the inside of the passages 8 would produce the same effect. Thus conventional methods of cold working metals such as rolling, hammering or shot-blasting of the inside surface of the passages 8 may be employed to produce the compressive stress in the inner layers or core 11. The cold working of the core 11 to produce a compressive pre-stressed condition will also place the outer layers 12 in a tensile pre-stressed condition.

In order to maintain the core 11 in the compressively prestressed condition the hub 7 and adjoining web should be placed in tension. In the quenching method this may be done by insulating the hub portion 7 of the brake disc 1 from the flow of cooling air or liquid. In the induction heating method the hub portion 7 should be heated along with the surface portion 11. In the cold working method the hub 7 is merely not cold worked.

The preferred embodiment of the invention is merely illustrative of the invention. Modifications thereof will be apparent to those skilled in the art within the scope of the claims.

I claim:

1. A brake element having an exterior braking surface, an outer region extending inwardly from said exterior braking surface, a central region behind said outer region, said outer region being pre-stressed in tension and said central region being pre-stressed in compression to provide an inner core which prevents the growth of cracks developing in the outer region having the braking surface.

2. In a brake assembly, a brake element having an exterior braking surface, an outer region extending inwardly from said exterior braking surface, a central region behind said outer region, said outer region being pre-stressed in tension and said central region being pre-stressed in compression to provide a central core which prevents the growth of cracks developing in the outer region at the braking surface.

3. A brake element having a braking surface adapted to be frictionally engaged by a cooperating brake element, and an outer portion providing the braking surface and located adjacent the braking surface, and an integral core portion providing support for said outer portion, said outer portion providing the braking surface being pre-stressed in tension and said core portion being pre-stressed in compression to prevent the growth of cracks from the braking surface.

4. A brake disc having side braking surfaces adapted to be frictionally engaged by cooperating brake elements and having a hub, a passage extending from the side face of the disc adjacent the hub radially to the periphery of the disc, the side braking surfaces and the adjacent outer portion of said disc being pre-stressed in tension and the central portion of said disc surrounding said passages being pre-stressed in compression.

5. A metal brake element having a braking surface adapted to be frictionally engaged by a cooperating brake element and an outer portion providing the braking surface and an integral core portion providing support for said outer portion, said outer portion having the braking surface being pre-stressed in tension and said core portion being pre-stressed in compression to prevent the growth of cracks.

6. A brake element as defined in claim 5 in which the brake element is a disc with a braking surface on a side face.

7. A brake disc having side braking surfaces adapted to be frictionally engaged by cooperating brake elements and having a hub, a passage extending from the side face of the disc adjacent the hub outwardly to the periphery of the disc, the side braking surfaces and the adjacent outer portion of said disc being pre-stressed in tension and the central portion of said disc surrounding said passages being pre-stressed in compression.

8. A brake disc having side braking surfaces adapted to be frictionally engaged by cooperating brake elements, an adjacent outer region, a central region behind said braking surface and a hub, a passage in said disc extending from a surface of said disc adjacent the center of said disc and extending outwardly through said central region to a surface of said disc adjacent the outer portion of said disc, said side braking surfaces and said adjacent outer region of said disc being pre-stressed in tension and said central region of said disc surrounding said passages being pre-stressed in compression.

References Cited in the file of this patent

UNITED STATES PATENTS

| Number | Name | Date |
| --- | --- | --- |
| 546,609 | Dearing | Sept. 17, 1895 |
| 1,527,798 | Hawley | Feb. 24, 1925 |
| 1,717,522 | Rosenberg | June 18, 1929 |
| 1,998,048 | Farr | Apr. 16, 1935 |
| 2,280,552 | Somes | Apr. 21, 1942 |
| 2,288,033 | Somes | June 30, 1942 |
| 2,412,432 | Tack | Dec. 10, 1946 |

OTHER REFERENCES

"Shot Peening," published by American Wheelabrator and Equipment Corporation, copyright 1947, Mishawaka, Indiana, Third Edition, pages 2, 3 and 4.